Figure 3:
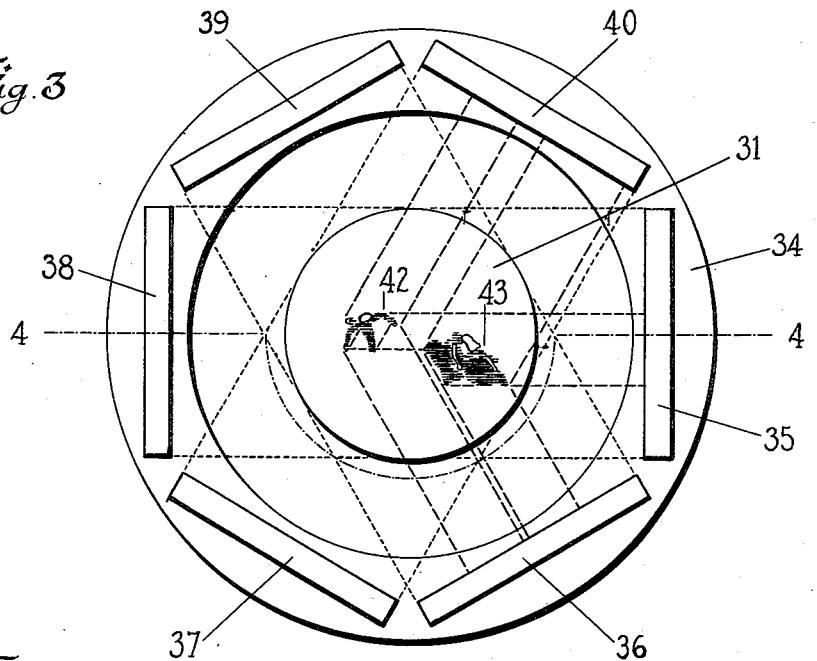

Sept. 28, 1943. P. W. LANG 2,330,225
PHONOVISION SYSTEM
Filed Sept. 23, 1940 9 Sheets-Sheet 1
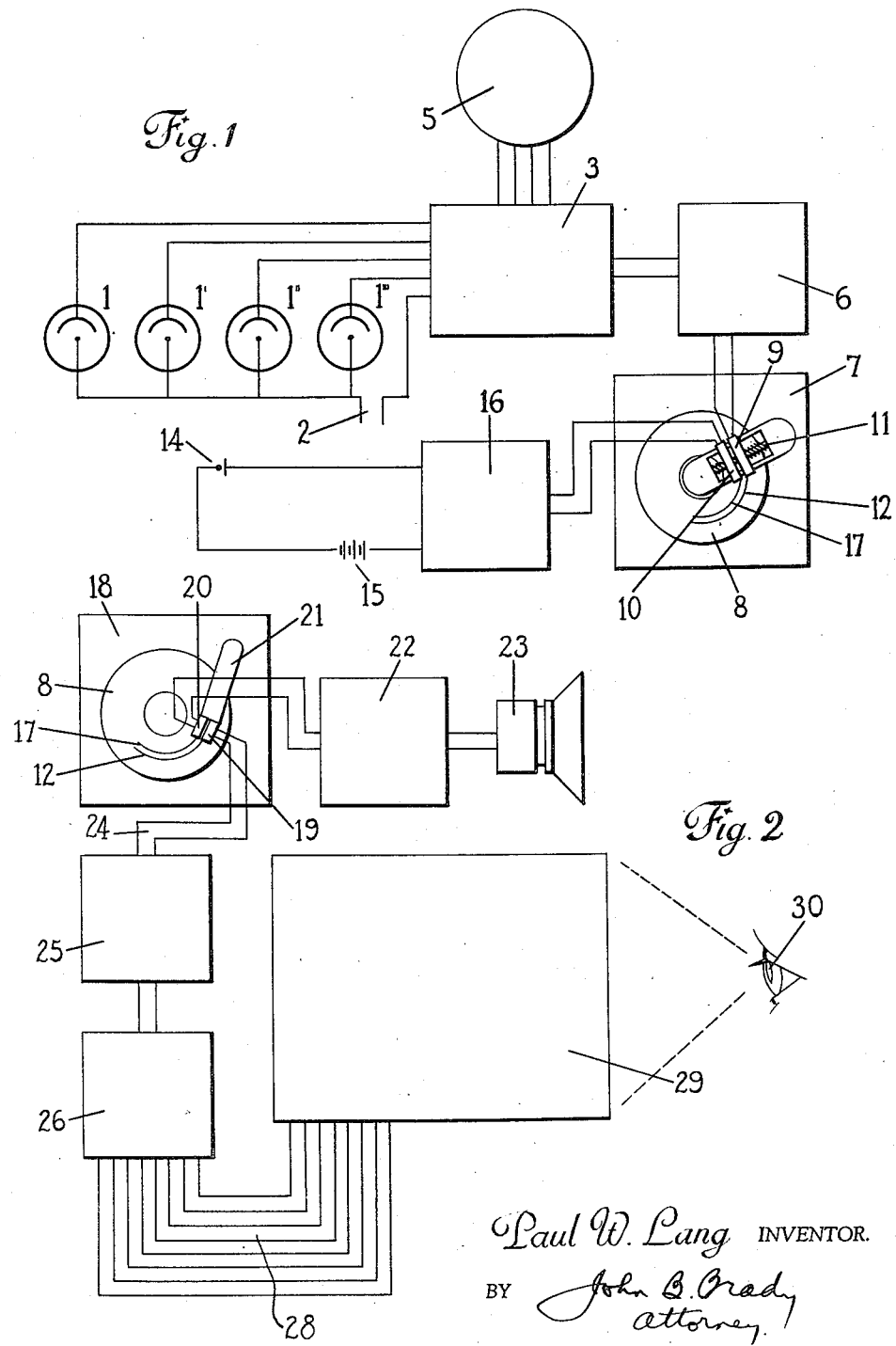
Paul W. Lang INVENTOR.
BY John B. Brady
attorney.

Sept. 28, 1943.  P. W. LANG  2,330,225
PHONOVISION SYSTEM
Filed Sept. 23, 1940  9 Sheets-Sheet 2

Paul W. Lang INVENTOR.
BY John B. Brady
attorney

Sept. 28, 1943.                P. W. LANG                2,330,225
                          PHONOVISION SYSTEM
              Filed Sept. 23, 1940            9 Sheets-Sheet 3

Paul W. Lang INVENTOR.

BY John B. Brady
        attorney

Sept. 28, 1943.   P. W. LANG   2,330,225
PHONOVISION SYSTEM
Filed Sept. 23, 1940   9 Sheets-Sheet 4
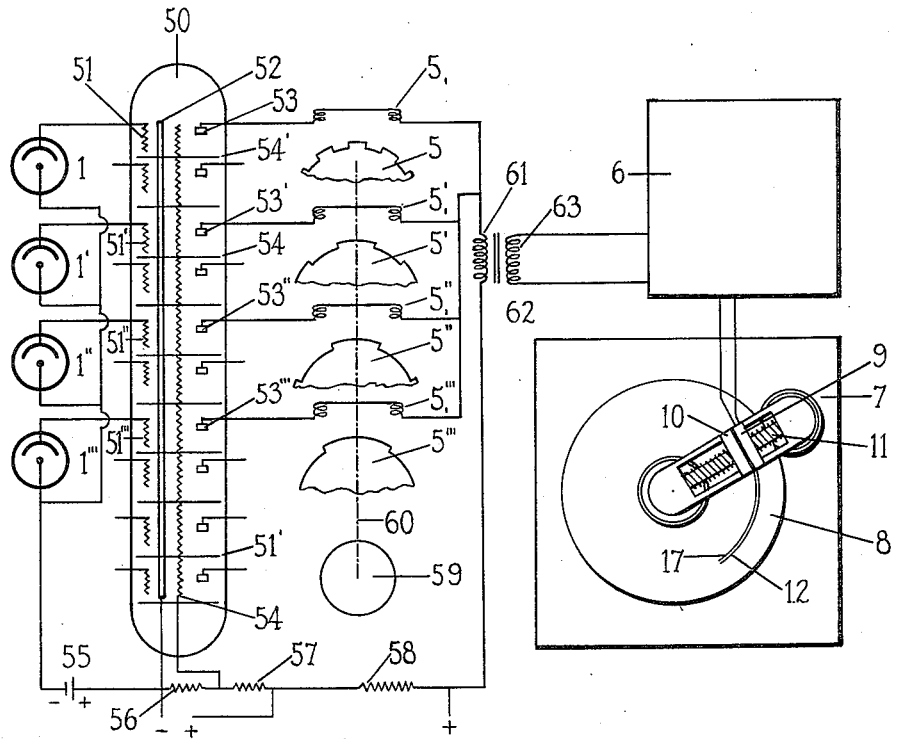
Fig. 8
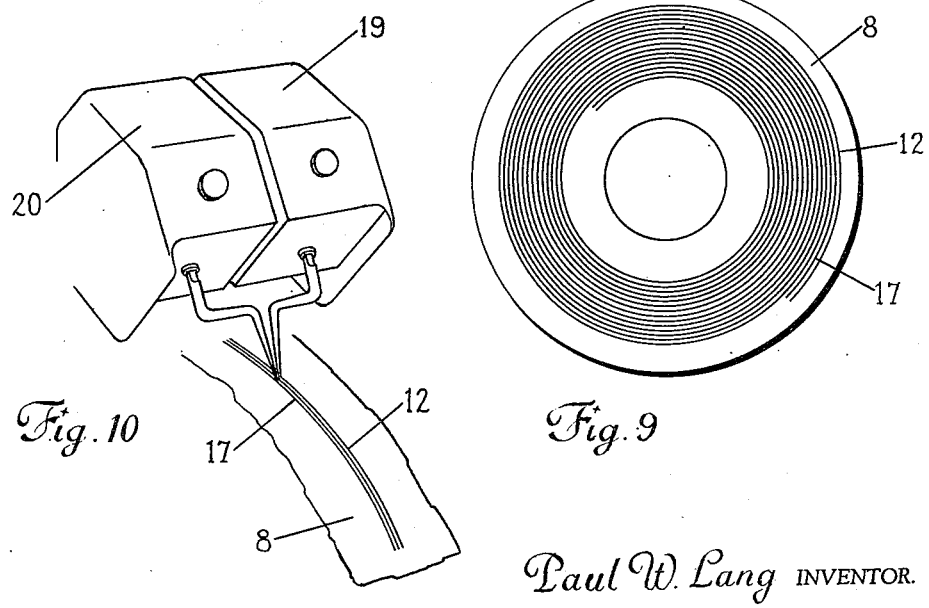
Fig. 10
Fig. 9
Paul W. Lang INVENTOR.
BY John L. Brady
attorney

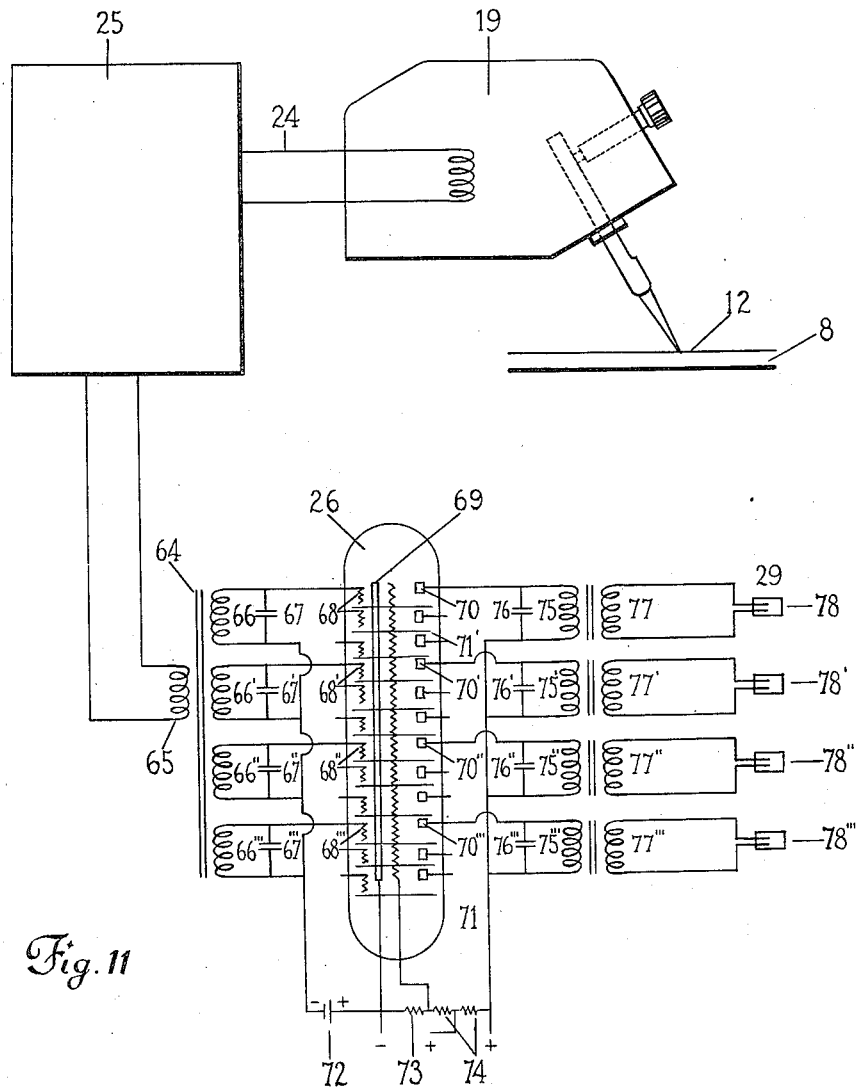

Sept. 28, 1943.   P. W. LANG   2,330,225
PHONOVISION SYSTEM
Filed Sept. 23, 1940   9 Sheets-Sheet 6
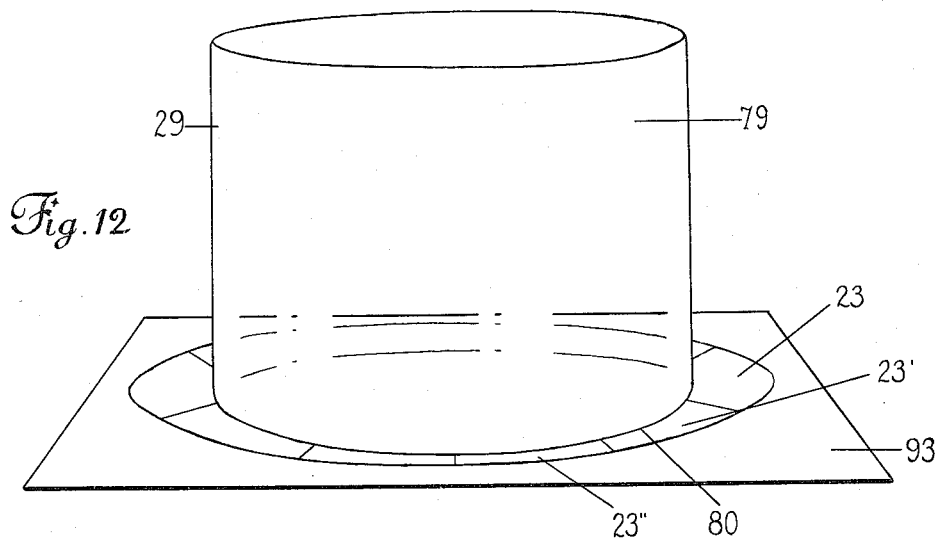
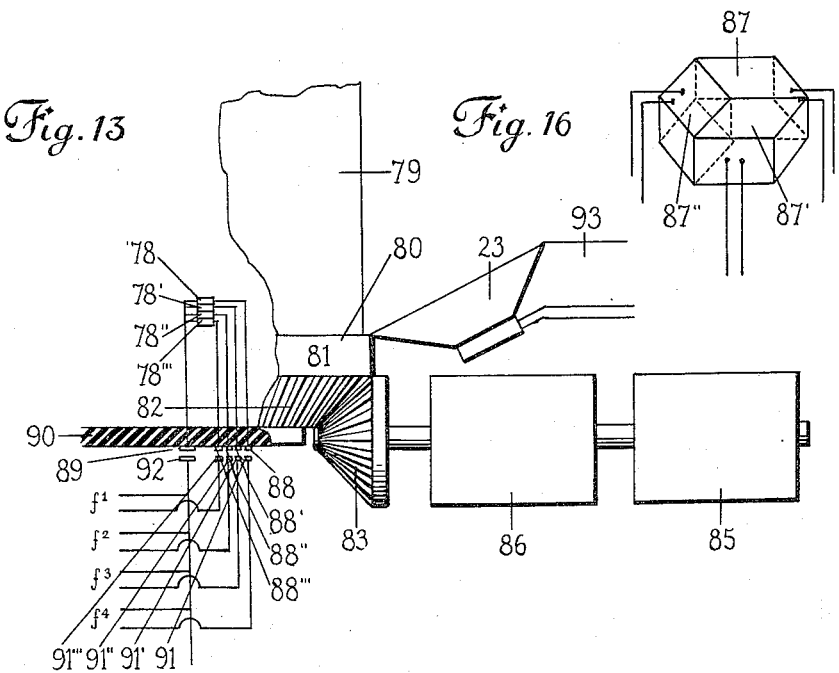
Paul W. Lang INVENTOR.
BY John B. Brady
attorney.

Sept. 28, 1943.　　　P. W. LANG　　　2,330,225
PHONOVISION SYSTEM
Filed Sept. 23, 1940　　　9 Sheets-Sheet 7

Paul W. Lang INVENTOR.
BY John B. Brady
Attorney

Paul W. Lang INVENTOR.

BY John B. Brady
attorney

Sept. 28, 1943. P. W. LANG 2,330,225
PHONOVISION SYSTEM
Filed Sept. 23, 1940 9 Sheets-Sheet 9
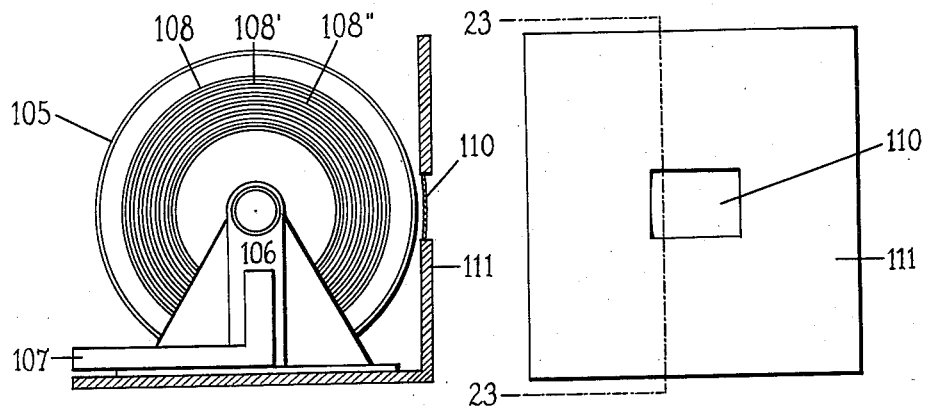
Fig. 23  Fig. 24
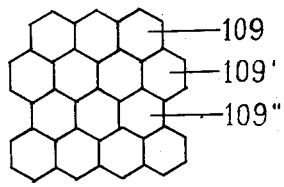  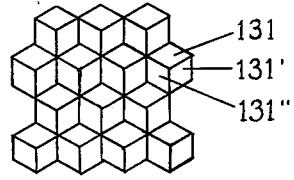
Fig. 25  Fig. 28
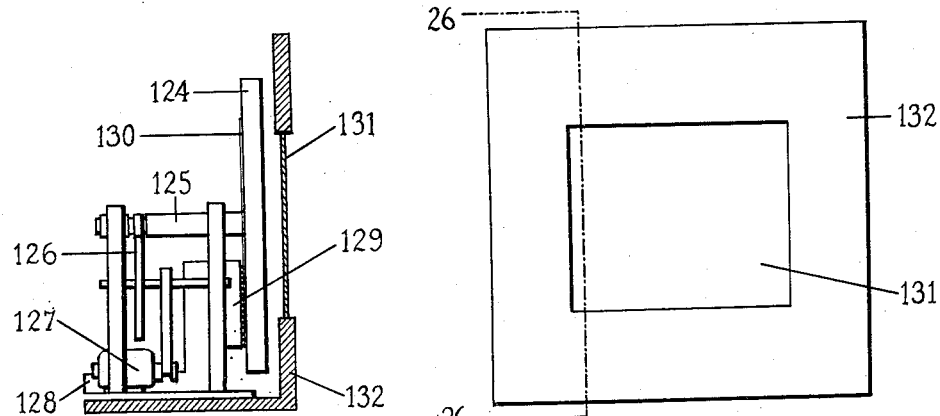
Fig. 26  Fig. 27
Paul W. Lang INVENTOR.
BY John B. Grady
attorney Patented Sept. 28, 1943

2,330,225

UNITED STATES PATENT OFFICE 2,330,225

PHONOVISION SYSTEM

Paul W. Lang, Concord, N. H.

Application September 23, 1940, Serial No. 357,999

7 Claims. (Cl. 178—6.5)

My invention relates broadly to electrical recording and reproduction of images accompanied by sound and more particularly to an improved method and apparatus for simultaneously recording movements and sound and reproducing the recorded images and sound.

One of the objects of my invention is to provide an improved method and apparatus for recording the movements of objects simultaneously with sound in a manner by which electrical impulses corresponding to such movements and sound may be recorded on a permanent record and reproduced from such record to simultaneously reproduce the image of the original object accompanied by sound incidental to the original production.

Another object of my invention is to provide a system and apparatus for recording and reproducing images with sound accompaniment in third dimension or perspective for imparting to the reproduced images a naturalness simulating the original object.

Still another object of my invention is to provide a method and apparatus for instantaneously reproducing movements with sound incidental thereto in third dimension or perspective for simulating the original scene with sound accompaniment.

A further object of my invention is to provide a method and apparatus for converting movements of objects into electrical impulses and utilizing such electrical impulses for actuating reproducing means operative to optically reproduce the movements of the objects in very substantial detail.

Figure 4:
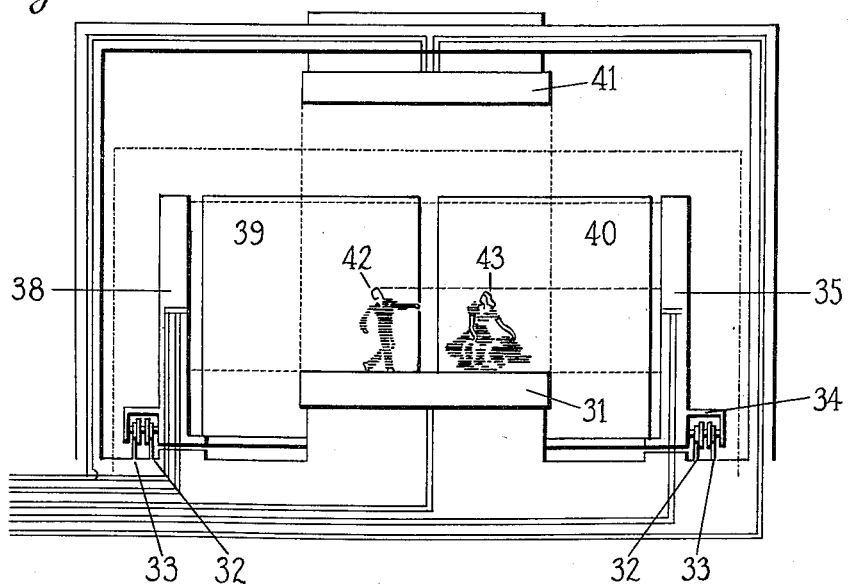
Figure 5:
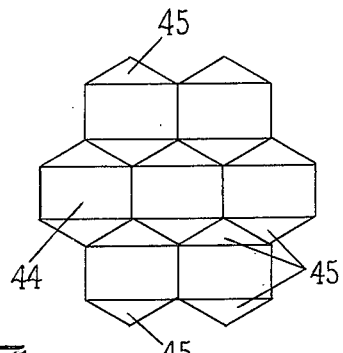
Figure 6:
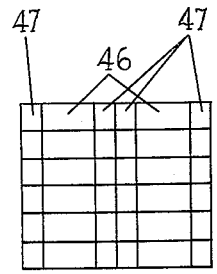
Figure 7:
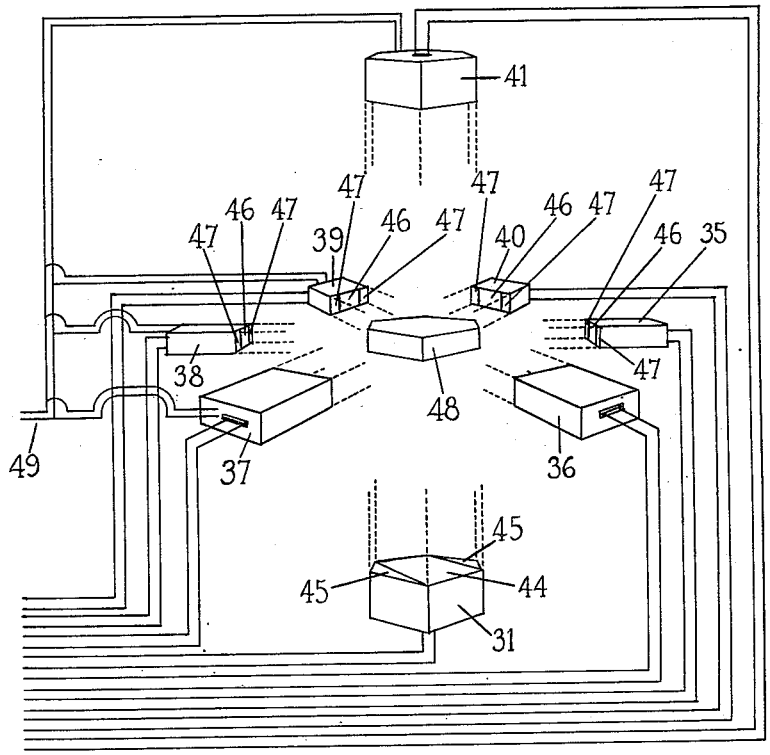
Figure 14:
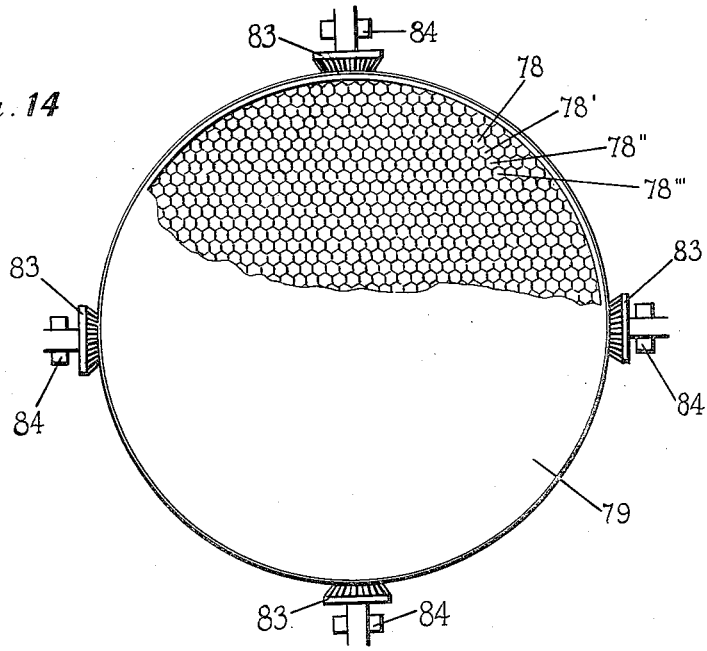

Other and further objects of my invention reside in improved methods and apparatus for converting the movement of animate objects into visual reproductions with sound accompaniment as set forth more fully in the specification hereinafter following by reference to the accompanying drawings, in which:

Figure 1 schematically shows one arrangement of the visual and sound recording circuits employed in the system of my invention; Fig. 2 schematically illustrates one arrangement of the sound and optical reproducing system of my invention; Fig. 3 is a plan view of one form of stage by which the movement of performing artists may be converted into electrical impulses for either instantaneous reproduction at some remote point or for the purpose of recording such impulses for subsequent reproductions; Fig. 4 is a vertical sectional view through the stage structure illustrated in Fig. 3 taken substantially on line 4—4 of Fig. 3; Fig. 5 is an enlarged schematic arrangement illustrating the association of light sensitive cells and light sources in the ceiling and floor structures of the stage shown in Figs. 3 and 4, it being understood that in the floor structure of the stage light sensitive cells are employed in adjacent positions whereas in the ceiling structure of the stage composite arrangements of adjacent light sources and light sensitive cells are employed; Fig. 6 illustrates in elevational view a fragmentary portion of one of the wall structures employed in association with the stage in Figs. 3 and 4, certain of which carry adjacent light sensitive cells while coacting opposite walls carry composite arrangements of light sensitive cells and light sources; Fig. 7 is a schematic view showing the arrangement of light sources and light sensitive cells in the side walls of the stage structure and in the ceiling and floor structure and the effect of an intermediate object upon the light sensitive cells when interposed in the path of diametrically opposite light sources; Fig. 8 is a more detailed schematic wiring diagram illustrating the manner of converting the movement of objects into electrical impulses for permanently recording such impulses on a disc record; Fig. 9 is a plan view of the type of disc record which receives the recording of tracings representing electrical impulses incident to the movement of objects as well as electrical impulses incident to the sound produced by the performers; Fig. 10 is a perspective view representing a dual type of reproducing head or pick-up which is operative under control of the record illustrated in Fig. 9 for reproducing the recorded impulses representative of both the movements of objects and the sound accompanying such movement; Fig. 11 is a schematic view illustrating the manner of selectively actuating light sensitive devices under control of recorded impulses representative of the movement of objects on the stage of Figs. 3 and 4; Fig. 12 is a perspective view illustrating the reproducing screen or apparatus in which the movement of objects is optically reproduced; Fig. 13 is a fragmentary view of the driving mechanism provided for the screen of Fig. 12 and illustrating one manner of establishing connection with the light reproducing devices or cells which are honeycombed throughout the structure of the viewing screen of Fig. 12; Fig. 14 is a top plan view of the viewing screen shown in Figs. 12 and 13, the view being partially broken away and showing the honeycomb arrangement of light cells for optically reproducing the movement of objects; Fig.

Figure 17:
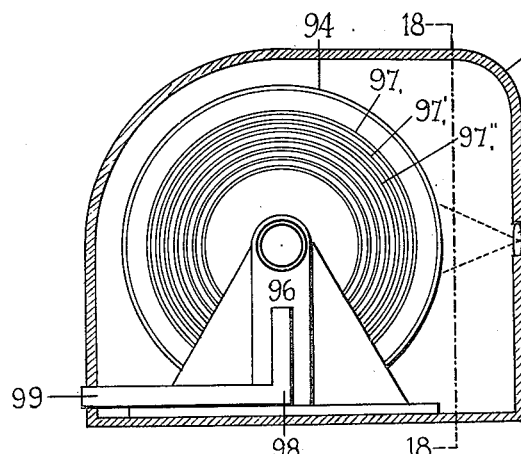
Figure 18:
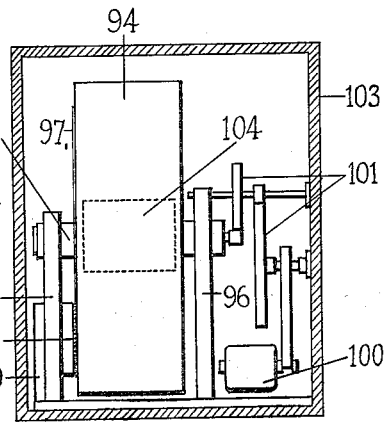
Figure 19:
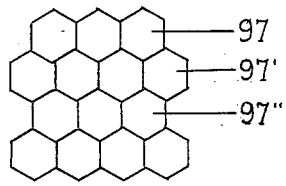
Figure 22:
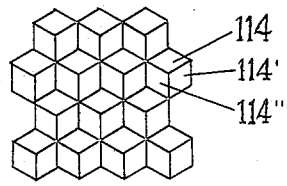
Figure 20:
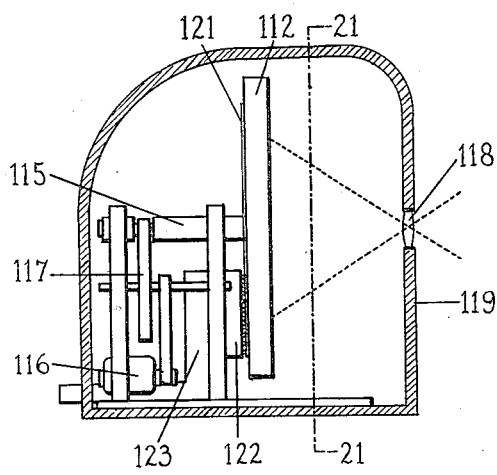
Figure 21:
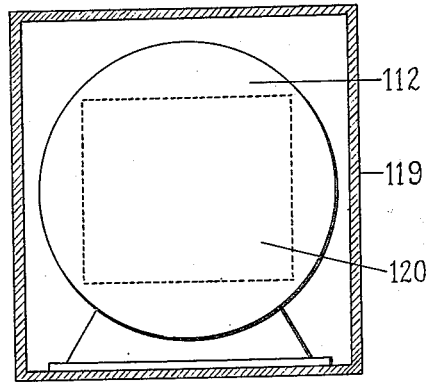

15 is a side elevational view of the screens shown in Figs. 12, 13 and 14, the view being partially broken away to show the honeycomb and row-like arrangement of the light sensitive cells therein; Fig. 16 illustrates a modified arrangement of light cells which are clustered before being honeycombed into the screen structure to provide for color reproduction under control of impulses from light sensitive cells in the recording stage which are discriminatory with respect to color; Fig. 17 shows a form of camera which may be employed for converting the movement of objects into electrical impulses where it is not feasible to utilize a stage structure as illustrated in Figs. 3-7; Fig. 18 is a longitudinal sectional view taken through the camera structure of Fig. 17 on line 18—18 thereof; Fig. 19 illustrates the arrangement of light sensitive cells employed in the camera construction of Figs. 17 and 18 on the surface of the rotatable drum thereof; Fig. 20 illustrates a modified form of camera which may be utilized for picking up scenes in the field and where a much larger picture may be recorded than in the form of camera illustrated in Figs. 17-19, the view illustrating the camera in side elevation with the casing shown in section; Fig. 21 is a front elevational view of the camera illustrated in Fig. 20, the casing being broken away and illustrated in section on line 21—21 of Fig. 20; Fig. 22 is a view of the light sensitive or photoelectric cells employed in the camera of Figs. 20 and 21, the cells being shown arranged in clusters for recording all color pictures; Fig. 23 is an end elevational view of a reproducing screen adapted to be operated in coaction with the camera of Figs. 17-19 under control of a circuit of the type illustrated in Figs. 2 and 11 for reproducing the movement of objects recorded by the camera of Figs. 17-19, the view being shown partially in section on line 23—23 of Fig. 24; Fig. 24 is an elevational view of the reproducing screen of the optical reproducer shown in Fig. 23; Fig. 25 illustrates the arrangement of light cells employed on the surface of the drum in the image reproducer of Figs. 23 and 24; Fig. 26 is a side elevational view of a modified form of image reproducer or screen device adapted to coact with the camera of Figs. 20-22, the view being shown partially in section substantially on line 26—26 of Fig. 27; Fig. 27 is a front elevation of the viewing screen of the image reproducer of Fig. 26; and Fig. 28 shows an arrangement of clustered light cells employed in the image reproducer of Figs. 26 and 27 where provision is made for color reproduction under control of the discriminatory light sensitive cell arrangement of Fig. 22 employed in the coacting camera of Figs. 20 and 21.

Referring to the drawings in detail, Fig. 1 schematically represents one bank of photoelectric cells disposed in a section of the wall or ceiling of the camera portion of the apparatus for viewing the animate objects on the stage. The photoelectric cell bank has been represented as comprising photoelectric cells 1, 1', 1" and 1"' connected through a source of potential indicated by circuit 2 to control a frequency selector 3. The frequency selector 3 may be of various types such as, for example, as set forth in Soller Patents 2,184,321 of December 6, 1939 and 2,210,010 of August 6, 1940. A suitable amplifier may be interposed between the frequency selector 3 and the camera comprising the banks of photoelectric cells as indicated generally at 1, 1', 1" and 1"'. The multiple frequencies supplied to the multiple frequency selector 3 are generated by any suitable type of multiple frequency generator which I have indicated at 5 and which may be of the type shown for example in Patent 1,477,271 of December 11, 1923 to Lowenstein. The selected frequencies individual to one or more of the photoelectric cells are amplified by a suitable amplifier indicated generally at 6 and supplied to the recorder shown generally at 7. The recorder comprises a standard record device indicated at 8 suitably driven by a motor over which a dual recording head 9—10 is suitably driven by feed screw mechanism shown generally at 11. The recording head 9 is connected to the output of amplifier 6 leading from the visual recording circuit producing a groove 12 in record 8 corresponding to frequencies which are characteristic of lights and shadows cast by the object on photoelectric cells, 1, 1', 1", 1"', etc. The adjacent recording head 10 is connected to a microphone circuit indicated generally at 14 located adjacent the artist performing within the range of the several banks of photoelectric cells. The microphone circuit 14 connects through suitable source 15 with the input circuit of amplifier 16, the output circuit of which is connected to the second recording head 10 simultaneously driven with the first recording head 9. The recording head 10 produces a groove 17 in record 8 adjacent to groove 12 in record 8. Thus various frequencies are recorded on the standard sound disc in accordance with lights and shadows cast upon the bank of photoelectric cells and in accordance with the sounds originated by the performers before the bank of photoelectric cells. The record 8 provides a composite record of both the optical effects produced by the artist and the sound effects produced by the artist. Fig. 1 is merely an elementary diagram of a restricted number of photoelectric cells and a microphone circuit and it will be realized that in carrying out my invention I employ many additional photoelectric cell circuits and additional microphone circuits in order to obtain third dimensional picture effects of the objects as will be pointed out in more detail hereinafter.

In Fig. 2 I have shown schematically the manner of reproducing the optical and sound images of the objects corresponding to the frequencies recorded on the record 8. The record 8 is transferred to the record driving table 18 constituting a transcription machine. The transcription machine includes a pair of reproducing heads 19 and 20 mounted on the same movable arm indicated at 21. The reproducing heads 19 and 20 each include a stylus operative in record grooves 12 and 17. Record groove 17 carries the sound record corresponding to the sound produced by the artist and operates the stylus on recording head 20 which is connected in the input circuit of amplifier 22, the output circuit of which connects to sound reproducer 23 for the reproduction of sound corresponding to the sound emanating from the performing artist. The reproducing head 19 connects through wires 24 to the input circuit of amplifier 25, the output circuit of which connects to a frequency selector 26 of suitable type such as the frequency selector of Soller Patent 2,184,321. The frequency selector connects to the input circuit of amplifier 27, the output circuit of which connects through conductors 28 with the viewing screen 29. The viewing screen 29 contains banks of glow discharge tubes arranged in corresponding physical positions and in corresponding proportions to the individual photoelectric cells 1, 1', 1'', 1''', etc. in the recorder. The viewing screen 29 may be either in the form of a flat surface, a drum-light surface or a cylindrical surface as will be hereinafter described in more detail. The eye of the observer is indicated generally at 30 in Fig. 2 and in this arrangement a cylindrical type viewing screen is employed. This cylindrical type viewing screen is rotated synchronously with the movement of the banks of photoelectric cells at the recorder as is shown more clearly in Figs. 3 and 4.

In Fig. 3 I have shown a typical form of stage upon which the artists perform. The stage comprises a circular platform indicated at 31 around which there is mounted for rotation on circular rails 32 and 33, an annular support 34 which carries the several vertically disposed walls 35, 36, 37, 38, 39 and 40 containing banks of photoelectric cells. It will be seen that the vertically extending walls extend diametrically opposite each other with the performing artists located therebetween. In walls 37, 38 and 39, in addition to the photoelectric cells there are light sources which are directed toward photoelectric cells in walls 40, 35 and 36 respectively. Thus the performing artists serve to optically obstruct the paths between the light sources in walls 37, 38 and 39 and the photoelectric cells in walls 40, 35 and 36 respectively. Walls 37, 38 and 39 contain photoelectric cells in addition to the light sources therein. Moreover the ceiling structure 41 contains banks of light sources and photoelectric cells directed toward stage 31. Stage 31 contains banks of photoelectric cells. The light sources in ceiling structure 41 are directed toward the photoelectric cells in stage 31. Thus the artists indicated generally at 42 and 43 cast shadows on multiple banks of photoelectric cells which are so located as to position that in the viewing screen 29 illustrated in Fig. 2, electric discharge tubes similarly located will reproduce the images of the artists. Wherever light sources are employed in combination with photoelectric cells in the same wall structure or ceiling, particular care is taken to shield the photoelectric cell from the light source in the same surface. Thus as will be pointed out hereinafter, a photoelectric cell in one surface is activated by a light source in an opposite surface and not by a light source which may be located adjacent thereto in the same surface and from which it is effectively shielded.

Referring to Fig. 5 the arrangement of the photoelectric cells and light sources in the ceiling structure 41 is illustrated in detail where provision is made for disposing the light sources in the areas 44 while the photoelectric cells or light sensitive cells are disposed adjacent thereto in the areas 45. In the correspondingly aligned portions of the floor structure 31 the photoelectric cells or light sensitive cells are disposed in each of the areas 44 and 45 and there are no light sources in such areas. Thus it will be understood that a photoelectric cell in the floor structure 31 is diametrically aligned with a light source in the ceiling structure 41. A light source in area 44 of the ceiling structure is directed upon a photoelectric cell in area 44 located in the floor structure 31. While a photoelectric cell in the area 45 in ceiling structure 41 is aligned with a photoelectric cell in area 45 in floor structure 31 and there is no directly aligned light source in this path, each of the photoelectric cells in the areas 45 in both the ceiling structure 41 and floor structure 31 are actuated by reflected light from the moving object simultaneously with the actual obstruction of light offered by the object in the path extending between the light source in area 44 in ceiling structure 41 and the photoelectric cell in area 44 in the floor structure 31.

In Fig. 6 I have shown the manner in which the walls are divided into mounting means for photoelectric cells and light sources. In walls 37, 38 and 39 areas 46 each contain light sources, whereas adjacent areas 47 contain photoelectric or light sensitive cells. On the diametrically opposite coacting walls 40, 35 and 36 photoelectric or light sensitive cells are contained in the areas 46 as well as in the areas 47. The light source in areas 46 in one wall thus are directly focused upon the photoelectric or light sensitive cells in the diametrically opposite areas 46 in the coacting wall. While the photoelectric cells in areas 47 in each of the walls do not have directly aligned and opposite light sources in coacting walls, nevertheless such photoelectric cells are activated by reflected light from the movable object.

In Fig. 7 I have shown an elementary diagram illustrating the coaction of the several photoelectric cells and light sources constituting the camera or stage upon which the artists perform. The movable object is indicated generally at 48 forming an obstruction insofar as the light source in the areas 44 of ceiling structure 41 is concerned with respect to the photoelectric cells in area 44 of floor structure 31. The object 48 also has reflective properties with respect to the photoelectric cells in areas 45 of both ceiling structure 41 and floor structure 31. Wall structures represented generally at 37, 38 and 39 each contain light sources in the areas 46 which are excited from power supply circuit 49. Each light sources 46 are obstructed by object 48 with respect to the photoelectric cells in areas 46 of wall structures 35 and 36 respectively. Power source 49 also excites the light sources in the areas 44 of ceiling structure 41. The photoelectric or light sensitive cells in the ceiling structure, floor structure and in the wall structures are arranged in banks and may be connected in a variety of ways to control the transmission of impulses which are either recorded or which directly actuate the optical system for reproduction of the images. In Fig. 7 I have illustrated the separate circuits from the variously positioned photoelectric cell banks brought out to connections which may extend to a suitable terminal board enabling the banks to be selectively connected to integrate the effects of the object upon the light sensitive cells for permitting reproduction in similitude therefrom.

In Fig. 8 I have illustrated the banks of photoelectric cells represented at 1, 1', 1'', and 1''' connected to the control grids of the multi-unit electron tube 50 of a type, for example, as disclosed more particularly in Walter Soller Patents 2,184,321 of December 26, 1939 and 2,210,010 of August 6, 1940 in which a multiplicity of control grids are provided with a control grid individual to each of the banks of photoelectric cells. For purposes of explaining my invention I have shown a representative number of such control grids wherein control grid 51 connects to the bank of photoelectric cells represented by reference character 1; control grid 51' connects to the bank of photoelectric cells represented by reference chaacter 1'; control grid 51'' connects to the bank of photoelectric cells represented by reference character 1''; and control grid 51''' connects to the bank of photoelectric cells represented by reference character 1'''. A hot cathode 52 is employed in the multi-unit electron tube 50. A plate electrode is provided individual to each of the control grids. I have illustrated a representative number of plate electrodes at 53, 53', 53'', 53''', etc. coacting with control grids 51, 51', 51'' and 51''' respectively. A screen grid 54 having partition extensions 54' thereon for preventing mutual interference between sets of discharge electrodes is provided in the multi-unit electron tube 50. Suitable potentials are supplied for the control grid circuit from the source of potential represented at 55 and for the screen grid circuit by the drop in potential across potentiometer 56—57 and for the plate circuit from the drop in potential across the additional potentiometer 58 from power supplied at the positive and negative terminals as illustrated. For the sake of simplicity the heating electrode for cathode 52 has been omitted. Each of the plate circuits contains a source of audio frequency current obtainable from a multi-frequency generator of the general type shown in Lowenstein Patent 1,477,271 of December 11, 1923. The generator includes a driving motor 59 having a shaft 60 on which there is mounted the variously shaped magnetic inductors 5, 5', 5'' and 5''', each of which act on windings 5₁, 5₁', 5₁'', 5₁''', etc. Because of the different shapes of the inductors, different audio frequencies are generated in the different plate circuits of the multi-unit electron tube 50 which may be selectively impressed through primary winding 61 of transformer 62 through the secondary winding 63, upon the input circuit of amplifier 6 for controlling the record cutting stylus 9 on the recorder 7 for producing the permanent record groove 12 in disc record 8.

In Fig. 9 I have shown the type of record which is produced, the wave trace 12 representing the impulses produced by the impulses representing the shape of the image while the parallel groove 17 represents the sound trace produced by the second recording circuit which actuates the engraving tool 10.

In Fig. 10 I have shown in perspective view the dual reproducing head in which the pick-up stylus leading from reproducing head 20 is operated by sound groove 17 while the image reproducing apparatus is operated by the stylus functioning in reproducing head 19 operating in wave trace 12.

In Fig. 11 I have shown in more detail the image reproducing system in which the stylus in the reproducing head 19 is operated from wave trace 12 in record 8 controlling the input to the amplifier 25 through circuit 24. Inasmuch as all of the frequencies represented by the generated frequencies incident upon the recording circuit may be present in the output system of the amplifier 25, it is necessary to provide frequency discriminating or selecting apparatus 26 which will operate optical devices responsive to selected frequency representing shapes of the original object. For this purpose I employ any suitable type of frequency selector such as, for example, the frequency selector of Soller Patent 2,184,321 represented generally at 26. The input system to the frequency selector comprises input transformer 64 having primary winding 65 and tuned selective secondary circuits 66, 66', 66'', 66''', etc. These secondary circuits are tuned by condensers 67, 67', 67'', 67''', etc. to be highly selective of frequency representing shapes of the object.

The frequency selective circuits connect to control grids 68, 68', 68'', 68''', etc. of the multi-unit electron tube of the type shown, for example, in Soller Patents 2,184,321 and 2,210,010. The multi-unit electron tube 26 includes suitable cathode 69 and sets of plate electrodes 70, 70', 70'' and 70''' individual to each of the control circuits 68, 68', 68'' and 68''' respectively. A suitable screen electrode 71 is provided with partition 71' thereon for preventing mutual interference between the various sections of the tube. Suitable potentials are supplied to the control grid circuits from the source of potential indicated at 72, to the screen circuit from suitable potentiometer 33 and to the plate circuits from additional potentiometer 74 from source of potential indicated by the positive and negative symbols. For the sake of simplicity the heating electrode for cathode 69 has been omitted. The plate circuits connected to the plate electrodes of the frequency discriminating system each connect to tuned circuits containing the primary winding of frequency selective coupling transformers. For example, I have shown tuned primary winding 75 connected to plate electrode 70, tuned primary winding 75' connected to plate electrode 70', tuned primary winding 75'' connected to plate electrode 70'', and tuned primary winding 75''' connected to plate electrode 70''', etc. The primary windings are tuned by condensers 76, 76', 76'' and 76''' respectively. The secondary windings of each of the frequency discriminating transformers are represented at 77, 77', 77'' and 77''' respectively. These secondary windings connect to the optical means on the viewing screen 29. I have represented the optical elements as comprising gaseous discharge tubes such as neon tubes which in the screen assembly are substantially in the shape of cubes or shaped envelopes which may be compactly assembled to form the optical system. I have represented the gaseous discharge tubes at 78, 78', 78'' and 78''', etc.

Figure 15:
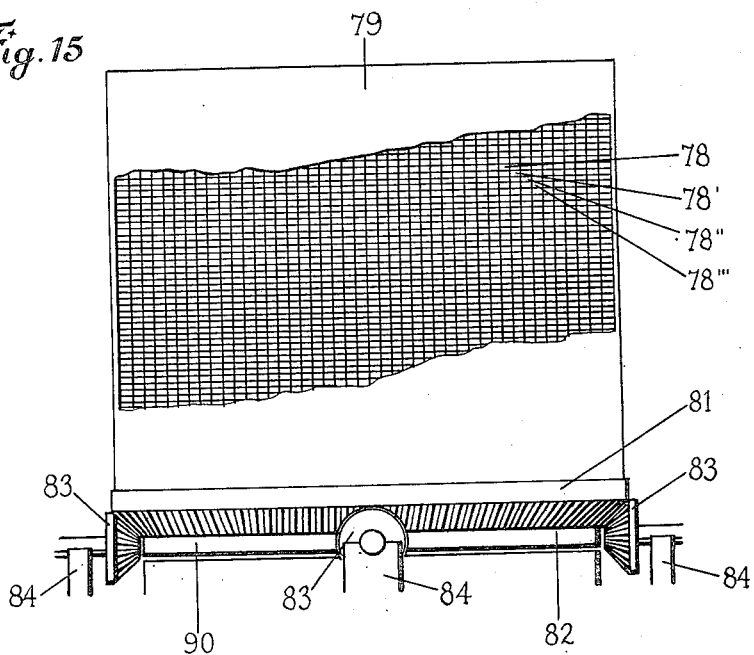

In Fig. 12 I have shown one form of the optical reproducing system of my invention constituting the view screen designated generally at 29. The viewing screen consists of a cylindrical casing of transparent material represented at 79 such as glass or unbreakable transparent plastic. The lower edge of the skirt 80 of the cylindrical structure 79 rests upon an annular support 81 shown more clearly in Fig. 13 which is in turn supported on an annular beveled rack indicated at 82. The beveled rack 82 is supported by beveled gears 83 distributed in suitable positions around the lower portion of the base of the cylinder 79 supported in suitable journals indicated in Figs. 14 and 15 at 84. One of the gears 83 may be driven from motor 85 through a suitable gear assembly represented at 86 for driving cylinder 79 at the required rotational speed in synchronism with the rotation of the vertically disposed walls 35, 36, 37, 38, 39 and 40 of the stage shown in Figs. 3 and 4. The transparent cylinder 79 provides a support for a honeycomb arrangement of gaseous discharge tubes 78, 78', 78'', 78''', etc. shown more particularly in Figs. 14 and 15. The electrical circuit arrangement for these gaseous discharge tubes has been represented generally in Fig. 13 and for simplicity these tubes have been shown in stacked arrangement but it will be understood that the tubes are arranged in positions in the cylinder 79 corresponding to the physical portions of the activating photoelectric cells in ceiling structure 41 and floor structure 31 and in wall structures 35, 36, 37, 38, 39 and 40 of the stage in Figs. 3 and 4. The electrical circuits from the gaseous discharge tubes are brought out to commutator rings 88, 88', 88'', 88''' and 89 carried by insulated plate 90 as illustrated in Fig. 13. The circuits carrying the activated frequencies indicated at $f^1$, $f^2$, $f^3$, $f^4$, each connect to brushes 91, 91', 91'', 91''' and 92 as indicated establishing connection with the movable segments 88, 88', 88'', 88''' and 89 respectively. Similar contact arrangements are provided for the other optical reproducing elements in the optical system. In order to reproduce the sound in a position directly adjacent the viewing screen I arrange the sound reproducers heretofore illustrated at 23 in Fig. 2, at 23, 23', 23'', etc. at a slight incline in the base 93 of the apparatus as illustrated generally in Figs. 12 and 13. Several loud speakers have been illustrated for the purpose of more evenly distributing the received sound and for the purpose of more faithfully reproducing the sound where the different loud speakers may be more efficient over different ranges of the reproduced frequency spectrum.

In Fig. 16 I have shown an arrangement of luminous discharge tube system divided into independent but compactly associated sections 87, 87' and 87'' each of which contain characteristically discriminating gases for reproducing discharges in different colors. Cells of this kind may be employed within the cylinder 79 and selectively arranged in banks to be activated by color discriminatory photoelectric cells arranged in the circuits of the camera of Figs. 3 and 4 for reproducing the images in color. The color reproducing arrangements of my invention will be more fully explained in connection with the forms of my invention illustrated in Figs. 17-28.

In Figs. 17-19 I have shown a modified form of camera which may be employed in lieu of the stage of Figs. 3 and 4 for recording or instantaneously transmitting impulses corresponding to the movements of objects or still scenes. Reference character 94 indicates a drum which is carried by a shaft 95 journaled in suitable bearings 96. The cylinder surface of the drum carries a multiplicity of photoelectric cells arranged, for example, as in Fig. 19 in compact relation one with respect to another and designated at 97, 97', 97''. These cells may be arranged in clusters and be prepared so as to be discriminatory with respect to color, for example, photoelectric cell 97 may be sensitive to blue, photoelectric cell 97' sensitive to yellow and photoelectric cell 97'' sensitive to red. The compact arrangement of cells on the surface of cylinder 94 have electrical connections extending through collector rings carried on one end of the drum represented generally at 97', 97₁', 97₁'', etc. Selective connection is established with the collector rings through contact members formed by individual brushes supported in suitable mounting means indicated generally at 98 from which conductors extend through conduit 99 to the recording equipment or directly to the image reproducing apparatus. The drum 94 is rotated by suitable driving motor 100 through gear system 101. A lens system indicated generally at 102 is mounted in suitable casing 103 by which the scene to be reproduced is focused within the area designated generally at 104 in Fig. 18 for activating the several photoelectric cells from which circuits are carried through conductors in conduit 97 to the recording or reproducing apparatus.

The image reproducing apparatus which coacts with the drum system of Figs. 17-19 is shown in Figs. 23-25 wherein a drum 105 is journaled in suitable bearings 106 and is driven synchronously with the movement of drum 94 to the recorder. A conduit 107 encloses conductors leading from the frequency selective system of suitable type such as illustrated in Fig. 11, to brushes which establish connection with the ring members 108, 108', 108'', etc. which are connected selectively to banks of gaseous discharge tubes arranged on the surface of the drum 105 in the arrangement shown in Fig. 25 at 109, 109', 109'', etc. These gaseous discharge tubes are provided with different gaseous fillers by which gaseous discharge of different color corresponding to the discriminating photo-electric cells illustrated in Fig. 19 is obtained. The integrated reproduced image is viewed on translucent screen 110 supported by frame 111 which houses the image reproducing apparatus.

I may also provide in lieu of the stage recording apparatus of Figs. 3 and 4, and image reproducing apparatus used in conjunction therewith, the arrangement illustrated in Figs. 21-22 and Figs. 26-28. In Fig. 20 I have illustrated a disc-like carrier 112 on which there is mounted clusters of light sensitive or photoelectric cells in an arrangement such as illustrated in Fig. 22. Photoelectric cells 114, 114' and 114'' are discriminatory as to color such as blue, yellow and red and are arranged in clusters as shown. The disc 112 is rotated by shaft 115 driven from motor system 116 suitably geared as represented at 117. The picture or scene to be recorded or reproduced is focused through lens 118 suitably mounted in casing 119 upon the photoelectric cells within the area 120 on disc carrier 112 as shown more clearly in Fig. 21. The rear of disc 112 carries suitable distributor rings 121 connected to the banks of photoelectric cells. Connection to the distributor rings is established through brushes 122 connected through conductors which extend through conduit 123 to the recording or reproducing equipment. At the reproducing end of the system a similar disc 124 is mounted for rotary movement under control of shaft 125 synchronously driven through suitable gear system 126 operated by motor 127. Conductors leading from the frequency disciminating circuits of a system such as illustrated in Fig. 11 extend through conduit 128 terminating in brushes mounted in suitable carrier 129 establishing connection with ring members 130 carried on the rear of disc 124. Disc 124 is provided with a system of gaseous discharge tubes such as illustrated in Fig. 28 constituted by clusters of differently colored tubes indicated at 131, 131' and 131'' as shown. The compactly arranged gaseous discharge tubes on the surface of disc 124 may be viewed through screen 131 arranged in frame 132 constituting the enclosure for the image reproducing apparatus.

In all of the embodiments of my invention the gaseous discharge tubes at the viewing screen are arranged in positions directly related and proportioned to the locations of the photoelectric cells in the camera or stage. The variable illuminosity produced by the glow discharge devices at the viewing screen simulate the object as viewed by the photoelectric cells at the camera or stage. The circuits of my invention have quick response and minimum electrical inertia so that movements of the object being viewed are instantaneously converted into electrical impulses which can be recorded or utilized to directly excite the viewing screen.

I have heretofore made reference to certain standardized and well known pieces of equipment such as multi-frequency generator and frequency selector apparatus. I desire that it be understood that any suitable generator and any form of frequency selective apparatus may be employed in the system of my invention and that I have made reference to prior disclosures only for the purpose of explaining my invention and not in a limiting sense. I realize that modifications may be made in the arrangement of the apparatus of my invention and I do not intend that my invention be limited to the particular embodiments shown but that my disclosure herein be considered as illustrative of my invention and within the scope of the appended claims.

What I claim as new and desire to secure by Letters Patent of the United States is as follows:

1. In a system for electrically reproducing the movements of objects, a stage for the performance which is to be electrically reproduced, a ceiling structure disposed above the stage, a plurality of wall sections adapted to be moved into a position substantially enclosing said stage, a multiplicity of light sources in said ceiling structure and certain of said wall sections, a multiplicity of groups of photoelectric cells in said stage, said ceiling structure and said wall sections, the photoelectric cells in said wall sections which also contain light sources being shielded from the direct rays of the light sources therein, means for revolving said wall sections in a circular path around said stage for enabling the photoelectric cells therein to effect a scanning of the performance on said stage in relation to the light source in the diametrically opposite wall section, and means for selectively connecting said groups of photoelectric cells to a circuit for producing control impulses corresponding to movements of the performance enacted on said stage.

2. In a system for electrically reproducing the movements of objects, a stage for the performance which is to be electrically reproduced, a wall structure substantially enclosing said stage, said wall structure supporting groups of photoelectric cells throughout the surface thereof, portions of said wall structure having light sources supported thereon and diametrically aligned with photoelectric cells in the opposite portions of said wall structure, the photoelectric cells and adjacent light sources in portions of said wall structure having light shields therebetween for preventing direct action of a light source upon an adjacent photoelectric cell, means for revolving said wall structure for enabling the photoelectric cells carried thereby to effect a scanning of the movements of objects on the stage in relation to the light source in the diametrically opposite wall section, and means for establishing connections between said banks of photoelectric cells and control circuits while said wall structure is revolving.

3. In a system for reproducing moving images, a stage for the performance which is to be electrically reproduced, a camera structure comprising supporting means disposed circumferentially of said stage, a multiplicity of groups of photoelectric cells mounted vertically in stacked relation on said supporting means and adapted to be focused upon a scene to be reproduced on said stage, means for illuminating the scene of the performance on said stage and optically activating in variable manner said photoelectric cells, means for moving said supporting means for enabling the photoelectric cells carried thereby to effect a scanning of the performance on said stage, means for shielding said groups of photoelectric cells from direct rays of light from said illuminating means intercepted by the objects constituting the performance on said stage and confining the activation thereof to light rays reflected by said objects, and means controlled by the individual photoelectric cells of each group of photoelectric cells for actuating glow discharge devices arranged in similitude with respect to said groups of photoelectric cells.

4. In a system for reproducing images of movable objects at a distance, a platform for the execution of a performance embodying the movable objects whose images are to be reproduced, a wall structure substantially enclosing said platform, photoelectric cells carried by certain portions of said wall structure, light sources carried by diametrically opposed and aligned portions of said wall structure whereby the objects intercept light rays from said light sources directed upon said photoelectric cells, an image reproducing system comprising a substantially transparent enclosure, a multiplicity of groups of glow discharge devices located within said substantially transparent enclosure in proportional relation to the position of the photoelectric cells in said wall structure, means for rotatably driving said wall structure whereby the photoelectric cells therein scan the objects on the platform in relation to the light sources in the diametrically opposite portion of said wall structure, and means for synchronously driving said transparent enclosure and imparting exciting impulses to the glow discharge devices therein in timed relation to the activation of the correspondingly positioned photoelectric cells.

5. In a system for reproducing images of moving objects, a stage for performances which are to be reproduced in similitude, means for substantially surrounding said stage with banks of photoelectric cells and coacting light sources diametrically opposed thereto whereby movements of objects incident to the performance on said stage modify the effect of said light sources upon all of the photoelectric cells in light range of the objects, means for combining the effects of variable changes in all of said photoelectric cells, and means for reproducing from the combined effects of said photoelectric cells an image in similitude.

6. An image reproducing system comprising in combination a stage for performances, the movements of which are to be electrically reproduced, a wall structure substantially enclosing the stage, said wall structure being honeycombed with photoelectric cells and coacting activating light sources diametrically opposed thereto and directed upon said photoelectric cells and adapted to be intercepted by the movements of the performance on said stage, means for revolving said wall structure for scanning the movements of the performance on said stage, a transparent optical viewing screen, a multiplicity of glow discharge devices mounted within said viewing screen in positions corresponding to the position of the controlling photoelectric cells in said wall structure, means for synchronously rotating said transparent optical viewing screen at a rate proportional to the rate of rotation of said wall structure, and means interconnecting the photoelectric cells in said wall structure with the glow discharge devices in said transparent optical viewing screen for selectively exciting certain of said glow discharge devices according to the movements of the performance on said stage.

7. In a system for electrically reproducing the movements of objects, a stage for the performance which is to be electrically reproduced, an annular support disposed concentrically about said stage, circular rails arranged adjacent said annular support, sets of wheels carried by said annular support and engageable with said rails for guiding said annular support in a rotary path around said stage, sets of vertically disposed walls carried by said annular support and extending in planes parallel with each other and substantially tangential to the path of movement thereof around said stage, banks of photoelectric cells arranged in said vertically disposed walls, certain of said vertically disposed walls including in addition to the photoelectric cells therein, a plurality of light sources directed toward the photoelectric cells in the extreme opposite walls, means for shielding the photoelectric cells in said second mentioned walls from the direct rays of the light sources therein and confining the activation of said photoelectric cells to reflected light from objects constituting the performance on said stage, and means for revolving said annular support for effecting a scanning operation of the objects constituting the performance on said stage by the banks of photoelectric cells in said vertically disposed walls.

PAUL W. LANG.